United States Patent
Lee

(10) Patent No.: US 12,095,238 B2
(45) Date of Patent: Sep. 17, 2024

(54) PLUG INTERLOCK DEVICE FOR CIRCUIT BREAKER

(71) Applicant: LS ELECTRIC CO., LTD., Anyang-Si (KR)

(72) Inventor: Moon-Sub Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 179 days.

(21) Appl. No.: 17/786,987

(22) PCT Filed: Mar. 17, 2020

(86) PCT No.: PCT/KR2020/003654
§ 371 (c)(1),
(2) Date: Jun. 17, 2022

(87) PCT Pub. No.: WO2021/125447
PCT Pub. Date: Jun. 24, 2021

(65) Prior Publication Data
US 2023/0014334 A1 Jan. 19, 2023

(30) Foreign Application Priority Data
Dec. 17, 2019 (KR) .......................... 10-2019-0168972

(51) Int. Cl.
*H02B 11/133* (2006.01)
*H02B 11/167* (2006.01)

(52) U.S. Cl.
CPC .......... *H02B 11/133* (2013.01); *H02B 11/167* (2013.01)

(58) Field of Classification Search
CPC ... H02B 11/133; H02B 11/167; H02B 11/127; H02B 11/02; H02B 11/173;
(Continued)

(56) References Cited

U.S. PATENT DOCUMENTS

| 5,459,293 A * | 10/1995 | Hodkin | H02B 11/12 361/609 |
| 6,545,234 B1 * | 4/2003 | Trivette | H01H 33/666 200/50.21 |

(Continued)

FOREIGN PATENT DOCUMENTS

| CN | 101615768 A | 12/2009 |
| CN | 102117719 A | 7/2011 |

(Continued)

OTHER PUBLICATIONS

Translation of KR 200489519 (Original document published Jun. 28, 2019). (Year: 2019).*

(Continued)

*Primary Examiner* — William A Bolton
(74) *Attorney, Agent, or Firm* — K&L Gates LLP

(57) ABSTRACT

The present disclosure provides a plug interlock device for a circuit breaker, comprising: a lever-type withdrawable interlock assembly provided at a transfer car so that inputting and withdrawal of a breaker main body can be locked; a plug connector assembly, which rises/lowers in response to insertion or separation of a control line plug into or from a connector provided at the upper part of the breaker main body; a shaft, which rotates in different directions according to the elevation of the plug connector assembly by connecting one side thereof to the lower end of the plug connector assembly; and a blocking plate connected to the other side of the shaft so as to lock or unlock the operation of the lever-type withdrawable interlock assembly while horizontally moving according to the rotation of the shaft.

9 Claims, 11 Drawing Sheets

(58) Field of Classification Search
CPC .. H01H 33/6606; H01H 33/666; H01H 33/46; H01H 33/48; H01H 33/50; H01H 71/10
USPC ......... 200/50.17, 50.18, 50.19, 50.21, 50.23, 200/50.24, 50.25, 50.26, 50.29, 50.3, 200/50.31
See application file for complete search history.

(56) References Cited

U.S. PATENT DOCUMENTS

| | | | |
|---|---|---|---|
| 7,582,837 B2 * | 9/2009 | Lyu | H02B 11/127 200/50.21 |
| 8,481,875 B2 | 7/2013 | Park et al. | |
| 8,575,502 B2 | 11/2013 | Yang et al. | |
| 8,796,570 B2 * | 8/2014 | Kobayashi | H01H 9/26 200/50.22 |
| 9,312,082 B2 * | 4/2016 | Milholland | H02B 11/133 |
| 9,673,595 B2 * | 6/2017 | Benke | H02B 3/00 |
| 9,732,543 B2 | 8/2017 | Kim et al. | |
| 9,779,891 B1 * | 10/2017 | Ashtekar | H02B 11/133 |
| 9,825,439 B2 | 11/2017 | Yang et al. | |
| 10,153,625 B2 * | 12/2018 | Lee | H01H 33/46 |
| 10,389,093 B2 | 8/2019 | Yang et al. | |
| 2011/0155545 A1 | 6/2011 | Yang et al. | |
| 2015/0102608 A1 | 4/2015 | Kim et al. | |
| 2018/0123329 A1 * | 5/2018 | Seo | H01H 9/0271 |

FOREIGN PATENT DOCUMENTS

| | | |
|---|---|---|
| CN | 102543516 A | 7/2012 |
| CN | 107919629 A | 4/2018 |
| CN | 207651377 U | 7/2018 |
| KR | 20110106737 A | 9/2011 |
| KR | 20150044298 A | 4/2015 |
| KR | 20160064806 A | 6/2016 |
| KR | 20160130087 A | 11/2016 |
| KR | 20170002473 U | 7/2017 |
| KR | 20180051834 A | 5/2018 |

OTHER PUBLICATIONS

Office Action for related Chinese Application No. 202080079389.7; action dated Nov. 25, 2023; (12 pages).
International Search Report for related International Application No. PCT/KR2020/003654; report dated Jun. 24, 2021; (5 pages).
Written Opinion for related International Application No. PCT/KR2020/003654; report dated Jun. 24, 2021; (4 pages).

* cited by examiner

PLUG INTERLOCK DEVICE FOR CIRCUIT BREAKER

CROSS-REFERENCE TO RELATED APPLICATIONS

This application is the National Stage filing under 35 U.S.C. 371 of International Application No. PCT/KR2020/003654, filed on Mar. 17, 2020, which claims the benefit of earlier filing date and right of priority to Korean Application No. 10-2019-0168972, filed on Dec. 17, 2019, the contents of which are all hereby incorporated by reference herein in their entirety.

FIELD

The present disclosure relates to a plug interlock device for a circuit breaker, and more specifically, a plug interlock device for a circuit breaker in which the circuit breaker retracts and extends only when a control line plug is in an inserted state, and the control line plug is not removed while the circuit breaker retracts and extends.

BACKGROUND

A circuit breaker blocks an internal circuit of the circuit breaker via an external relay in an event of abnormal current such as overcurrent, short circuit, or ground fault in an extra-high voltage/high voltage distribution line to protect people and equipment.

Such a circuit breaker is installed in a switchboard received and managed in several electric devices for operation or control of power plants and substations, and operation of electric motors. In this regard, the circuit breaker is generally installed such that a circuit breaker body is housed inside a cradle fixed to the switchboard.

Inside the switchboard, there are a service position where a terminal of the circuit breaker is connected to a load terminal of the cradle such that supply of voltage and current is enabled, and a test position where only an operation test of the circuit breaker is possible because the terminal of the circuit breaker is removed from the terminals of the cradle.

A scheme in which the circuit breaker body retracts into the cradle includes a scheme using a screw and a scheme using a lever.

FIG. 1 and FIG. 2 show the circuit breaker in which a lever is extendable and retractable. FIG. 1 shows a state in which a circuit breaker body 1 is placed at the test position, and FIG. 2 shows a state in which a circuit breaker body 1 is placed at the service position. The circuit breaker body 1 retracts into the cradle 3 while being loaded on a transfer device 2. In the test position of FIG. 1, a terminal 1a of the circuit breaker body 1 is removed from a cradle terminal 3a of the cradle 3. In the service position of FIG. 2, the terminal 1a of the circuit breaker body 1 is connected to the cradle terminal 3a of the cradle 3.

FIG. 3 shows a cradle according to a prior art. The cradle 3 is equipped with a position bracket 4, and the position bracket 4 has a test position hole 4a and a service position hole 4b defined therein for fixing the circuit breaker body 1 at the test and service positions, respectively.

FIG. 4 shows an internal configuration of the circuit breaker body. A lever-type extending/retracting motion interlock device 5 is installed on a bottom of the circuit breaker body 1. FIG. 4 shows the circuit breaker body 1 in the test position. In this regard, the lever-type extending/retracting motion interlock device 5 is inserted into the test position hole 4a to restrict a movement of the circuit breaker body 1. In this regard, the circuit breaker body 1 may be transferred only when a lever 5a is lifted up and then the lever-type extending/retracting motion interlock device 5 is removed from the test position hole 4a. After moving the circuit breaker body 1 to the service position, the lever 5a may be lowered down so that the lever-type extending/retracting motion interlock device 5 is inserted into the service position hole 4b.

FIG. 5 shows a state in which a control power plug 6 is inserted in a top portion of the circuit breaker body 1. The control power plug 6 transmits a status of the circuit breaker body 1 to a control panel (not shown).

In the prior art of FIG. 1 to FIG. 5, the lifting up of the lever 5a inserted into the holes 4a and 4b therefrom is performed irrespective of whether the control power plug 6 is inserted or not into the top portion of the body 1. Thus, even when the control power plug 6 is not inserted into the top portion of the circuit breaker body 1, the lever 5a may be lifted up and thus the circuit breaker body 1 may retract into the cradle.

However, while the control power plug 6 is not inserted into the circuit breaker body 1, the circuit breaker body 1 may move to the test/service positions. The control power plug 6 is disconnected therefrom during the movement. In this case, remote control of the circuit breaker may not be achieved in an event of an emergency. Thus, an accident may occur. Therefore, while the circuit breaker body 1 retracts and extends into and from the cradle, the control power plug 6 must be inserted into the circuit breaker body.

SUMMARY

The present disclosure has been devised to solve the above problem. Thus, a purpose of the present disclosure is to provides a plug interlock device for circuit breaker in which the circuit breaker retracts and extends only when the control line plug is in an inserted state, and the control line plug is not removed while the circuit breaker retracts and extends.

Further, a purpose of the present disclosure is to provide a plug interlock device for a circuit breaker that may be easily manufactured at a low cost, has improved durability, operates stably, and may easily check whether the device operates normally.

In order to solve the above problems, there is provided a plug interlock device for a circuit breaker, the plug interlock device comprising: a lever-type extending/retracting motion interlock assembly 130 installed on a transfer vehicle 120 so as to allow or disallow a retracting and extending motion of a circuit breaker body 110; a plug connector assembly 140 configured to ascend and descend as a control line plug 210 is inserted into or removed from a connector 112 disposed on a top of the circuit breaker body 110; a shaft 150 having one side connected to a lower end of the plug connector assembly 140, wherein the shaft rotates in different directions based on ascending and descending of the plug connector assembly 140; and a blocking plate 160 connected to the other side of the shaft 150, wherein the blocking plate 160 moves horizontally based on the rotation of the shaft 150 so as to allow or disallow a movement of the lever-type extending/retracting motion interlock assembly 130.

The shaft 150 is supported on a support 152 and thus rotates in place.

The plug interlock device further comprises a first link 170 having one side rotatably and movably connected to a lower end of the plug connector assembly 140 and the other side coupled to one side of the shaft 150.

A first sliding hole 172 is formed in one side of the first link 170, wherein the first link 170 is rotatably and movably connected to the lower end of the plug connector assembly 140 through the first sliding hole 172.

The plug interlock device further comprises a second link 180 having one side rotatably and movably connected to the blocking plate 160 and the other side coupled to the other side of the shaft 150.

A second sliding hole 182 is formed in one side of the second link 180, wherein the second link 180 is rotatably and movably connected to the blocking plate 160 through the second sliding hole 182.

The blocking plate 160 has a protrusion 162 formed on one side thereof, wherein the protrusion 162 moves along a guide groove 122 extending in a horizontal direction and formed in the transfer vehicle 120.

The lever-type extending/retracting motion interlock assembly 130 includes: an interlock lever 134 moving under an external force; and an interlock shaft 132 connected to the interlock lever 134 so as to allow or disallow the retracting and extending motion of the circuit breaker body 110.

The blocking plate 160 is disposed between the interlock shaft 132 and an end of the interlock lever 134 receiving an external force and is configured to allow or disallow a movement of the interlock lever 134.

The lever-type extending/retracting motion interlock assembly 130 further includes: a mount plate 131 installed on a bottom face of the transfer vehicle 120, wherein the interlock shaft 132 extends through the mount plate; an interlock pin 133 extending through the interlock shaft 132 and the mount plate 131; and a return spring 135 disposed between the interlock pin 133 and the mount plate 131 so as to provide an elastic force.

The interlock pin 133 moves up and down along a through-hole formed in the mount plate 131.

The plug interlock device further comprises a spring 190 having one end coupled to the blocking plate 160 and the other end coupled to the transfer vehicle 120.

The spring 190 is elastically deformed based on a horizontal movement of the blocking plate 160.

According to an embodiment of the present disclosure, as the control line plug 210 is inserted into or removed from the connector 112, the plug connector assembly 140 moves up or down. The shaft 150 rotates according to the moving up or down of the plug connector assembly 140. The blocking plate 160 moves horizontally based on the rotation of the shaft 150, thereby allowing or disallowing the movement of the lever-type extending/retracting motion interlock assembly 130. Therefore, the circuit breaker body 110 may retract into and extend from the cradle only in a state in which the control line plug 210 is inserted into the circuit breaker body. The control line plug 210 may not be removed therefrom while the circuit breaker retracts and extends into and from the cradle.

Further, durability of the plug interlock device may be easily improved at a low cost and in a simple configuration, and the plug interlock device may operate stably.

Further, a kinetic force is transmitted via the rotation of the shaft 150. Thus, even when the plug connector assembly 140 and the blocking plate 160 are far apart from each other, the kinetic force may be transmitted stably therebetween. Therefore, the blocking plate 160 may be freely installed in an appropriate position regardless of a distance thereof from the plug connector assembly 140.

Further, the protrusion 162 moving along the guide groove 122 extending the horizontal direction and formed in the transfer vehicle 120 may be easily observed from an outside. Thus, an operator of the device may easily check whether the plug interlock device operates normally.

In addition to the above-described effects, specific effects of the present disclosure will be described together while describing specific details for carrying out the present disclosure.

DETAILED DESCRIPTIONS

Figure 1:
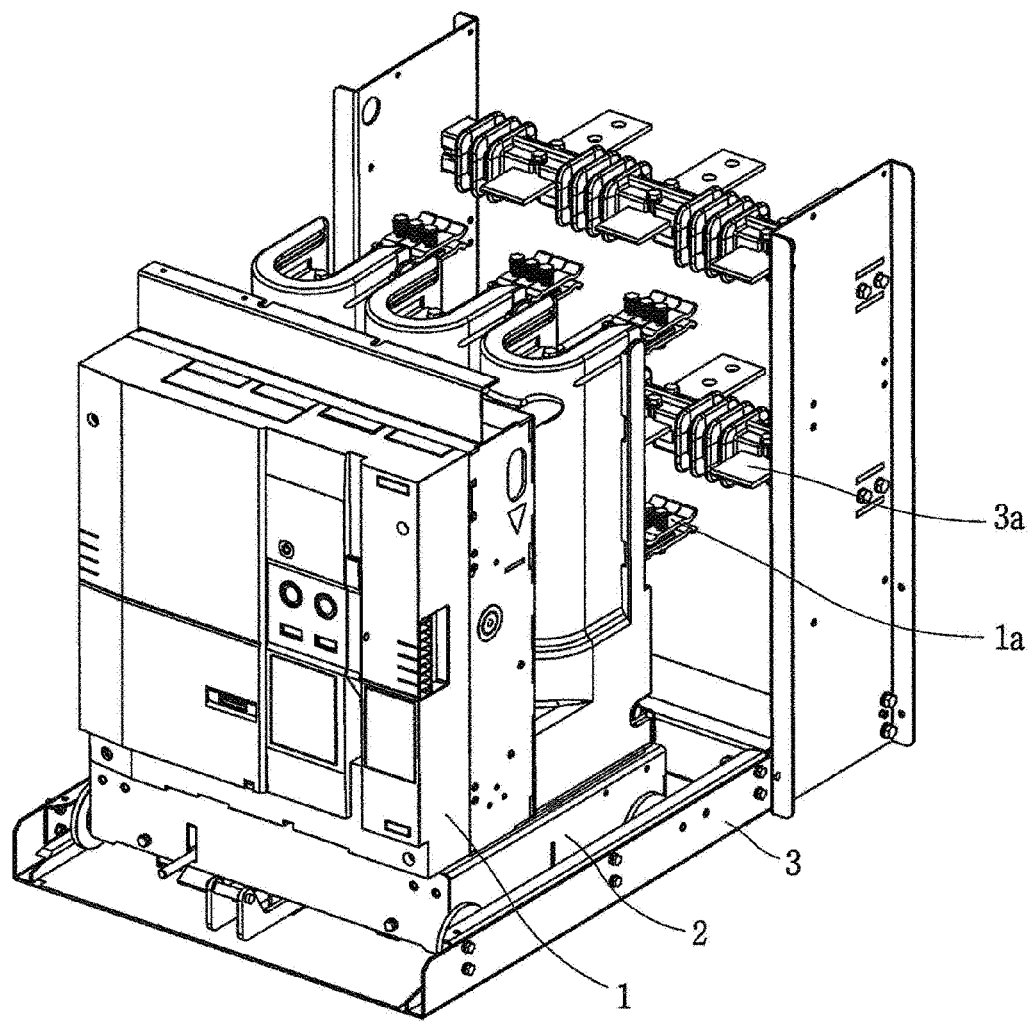
FIGS. 1 to 5 are views showing the prior art.
Figure 2:
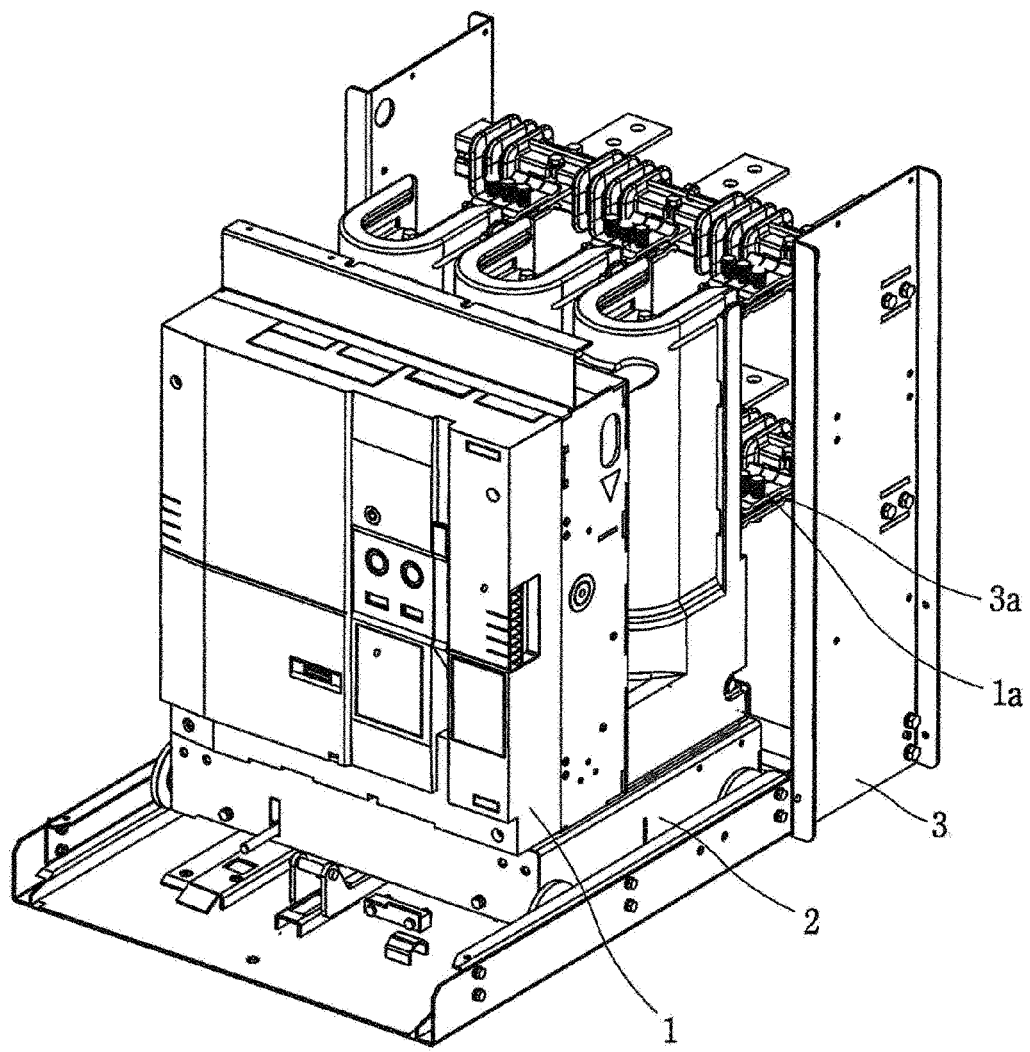

Hereinafter, a preferred embodiment of the present disclosure will be described in detail with reference to the accompanying drawings.

The present disclosure is not limited to embodiments as disclosed below, but may be implemented in a variety of different forms. These embodiments are set forth only to make the present disclosure complete, and to completely inform the scope of the disclosure to those of ordinary skill in the technical field to which the present disclosure belongs. Therefore, the present disclosure is not limited to the embodiments as disclosed below. A component of one embodiment and a component of another embodiment may be substituted with each other. A component of one embodiment may be added to another embodiment. It should be understood that changes, equivalents or substitutes may be included in the technical spirit and scope of the present disclosure.

The attached drawings are only set forth for easy understanding of the embodiments as disclosed in the present disclosure, and the technical idea as disclosed in the present disclosure is not limited by the attached drawings. It should be understood that modifications, equivalents or substitutes may be included in the spirit and scope of the present disclosure. In the drawings, in consideration of convenience of understanding, a size or a thickness of a component may be exaggeratedly large or small. However, this should not be interpreted as limiting the scope of protection of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In addition, it will also be understood that when a first element or layer is referred to as being present "on" a second element or layer, the first element may be disposed directly on the second element or may be disposed indirectly on the second element with a third element or layer being disposed between the first and second elements or layers.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 6 to FIG. 9 are internal perspective views and partial perspective views showing a state in which a control line plug is removed from a circuit breaker according to one embodiment of the present disclosure, and FIG. 10 to FIG. 13 are internal perspective views and partial perspective views showing a state in which the control line plug is inserted into the connector breaker.

Referring to FIG. 6 to FIG. 13, a plug interlock device for a circuit breaker according to one embodiment of the present disclosure includes a lever-type extending/retracting motion interlock assembly 130, a plug connector assembly 140, a shaft 150 and a blocking plate 160. Before describing each of the components of the plug interlock device for the circuit breaker, a circuit breaker body 110 and a transfer vehicle 120 will be first described.

The circuit breaker body 110 may have a connector 112 on a top portion thereof and may be installed on a top portion of the transfer vehicle 120. The drawing shows a portion related to the present disclosure in an inside of the circuit breaker body 110.

Figure 3:
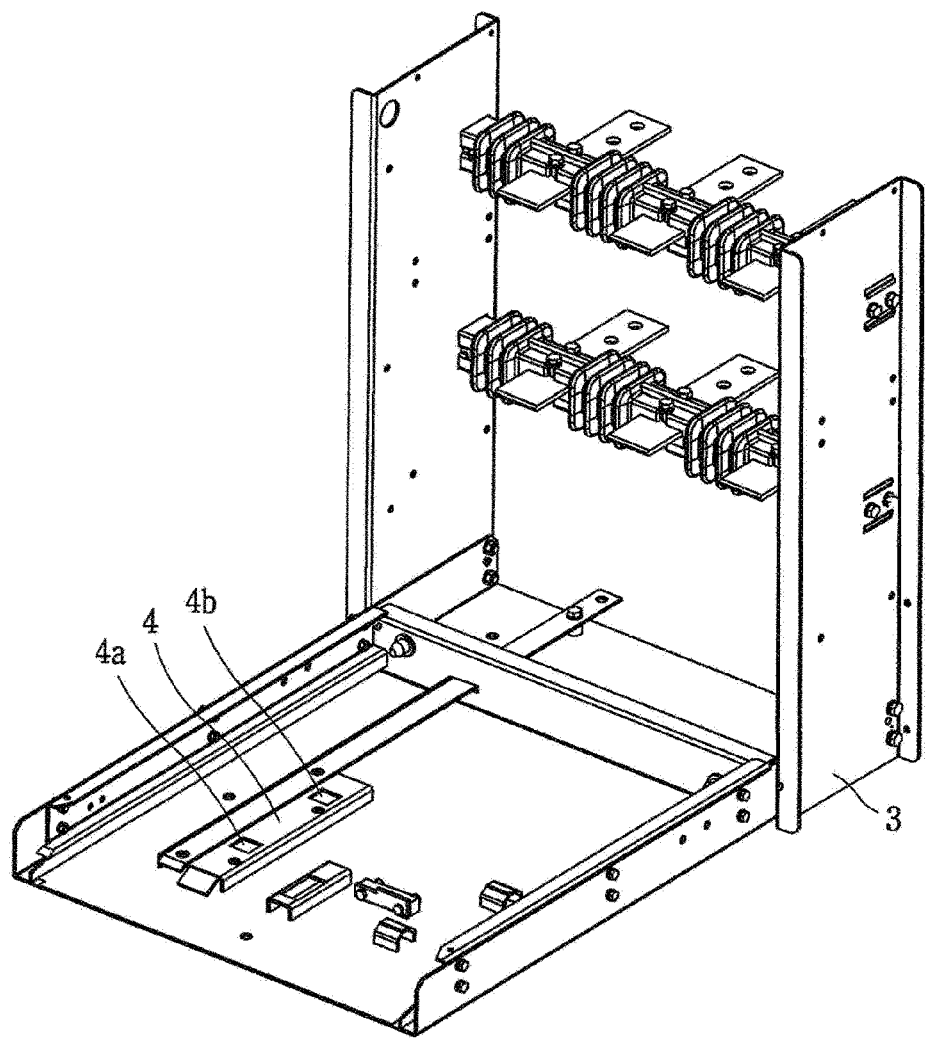
Figure 4:
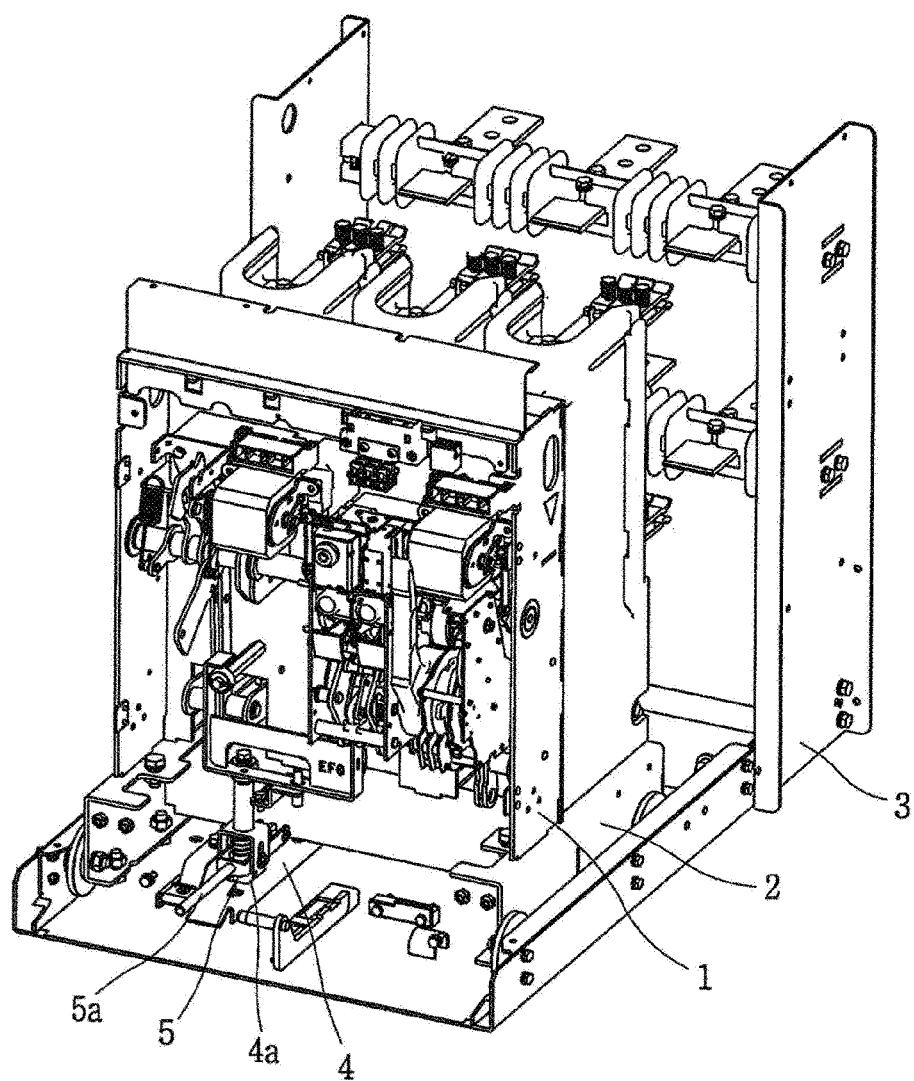
Figure 5:
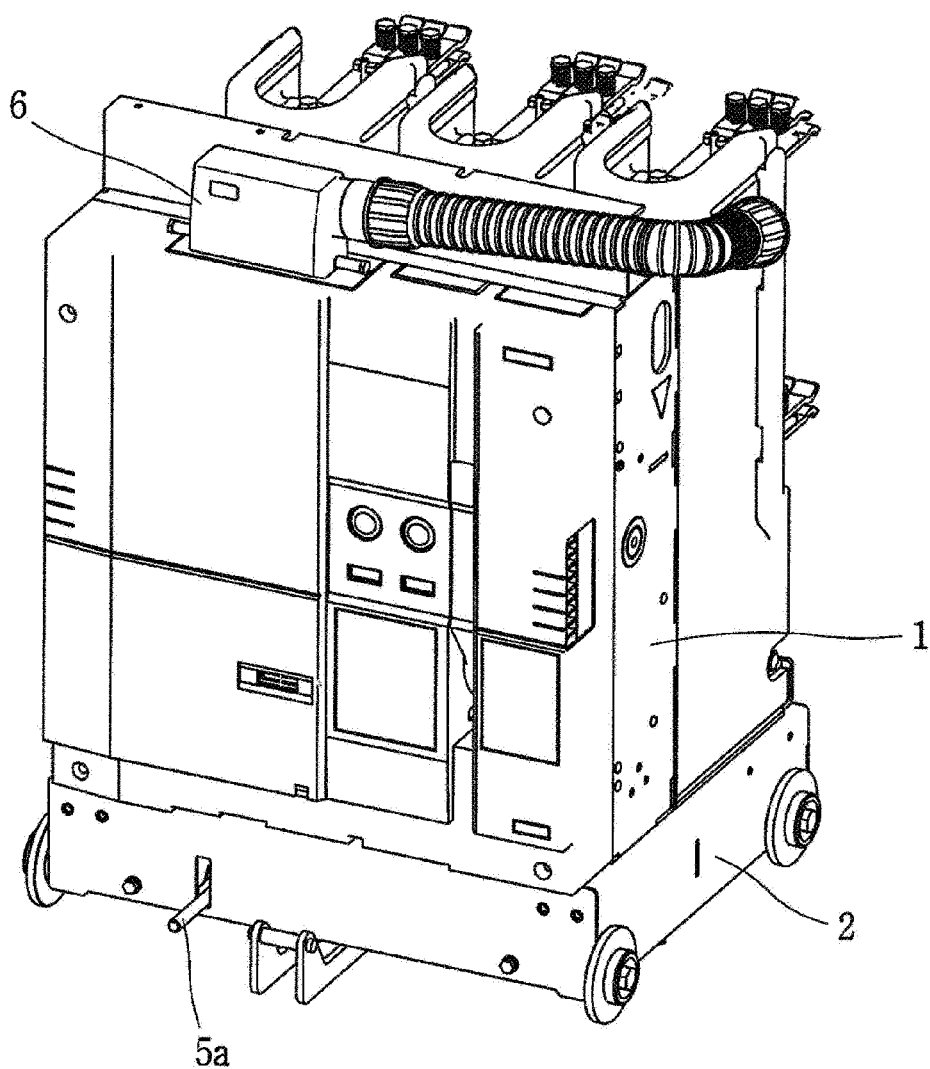
Figure 6:
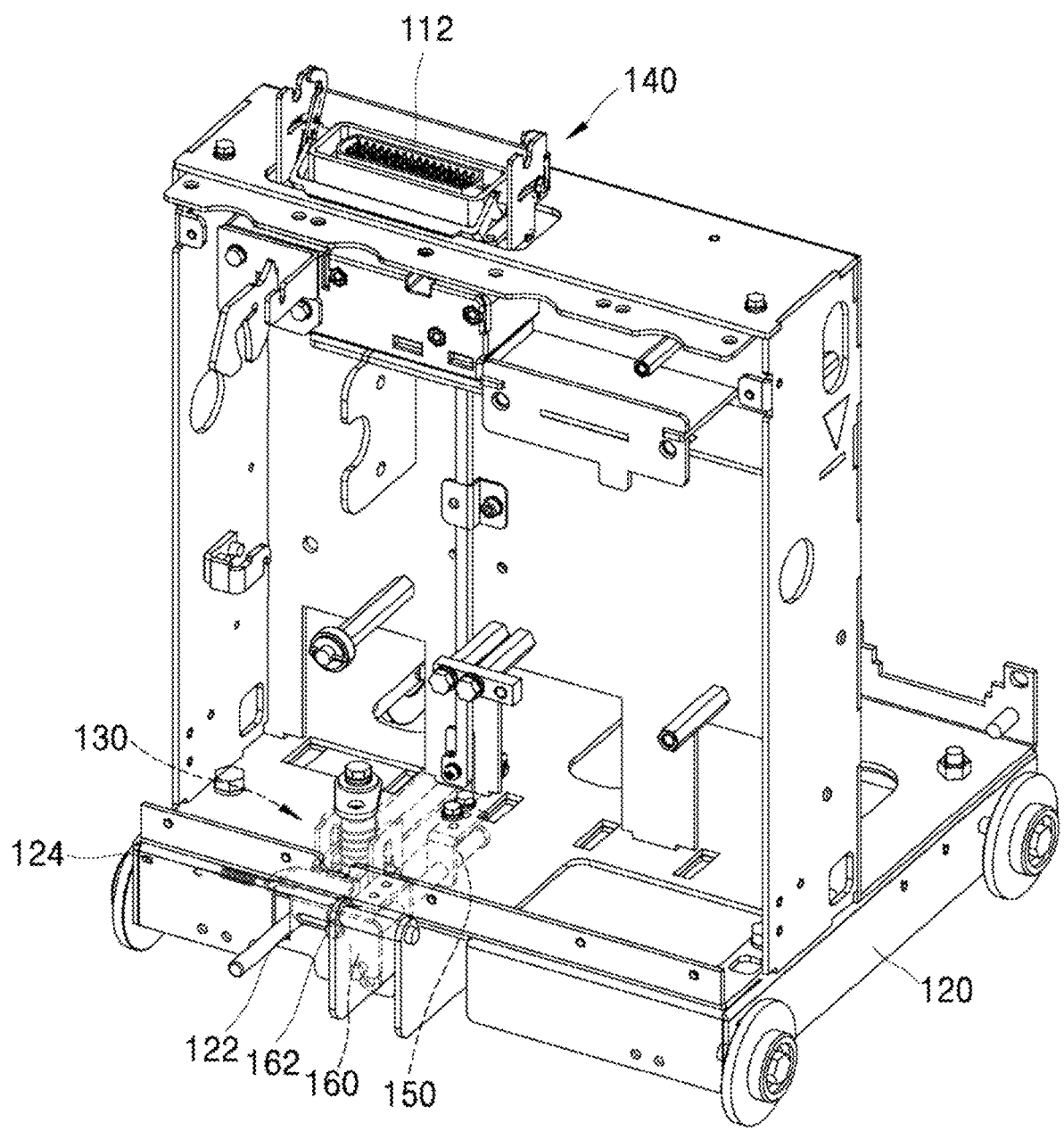
FIG. 6 to FIG. 9 are internal perspective views and partial perspective views showing a state in which a control line plug is removed from a circuit breaker according to one embodiment of the present disclosure.
Figure 7:
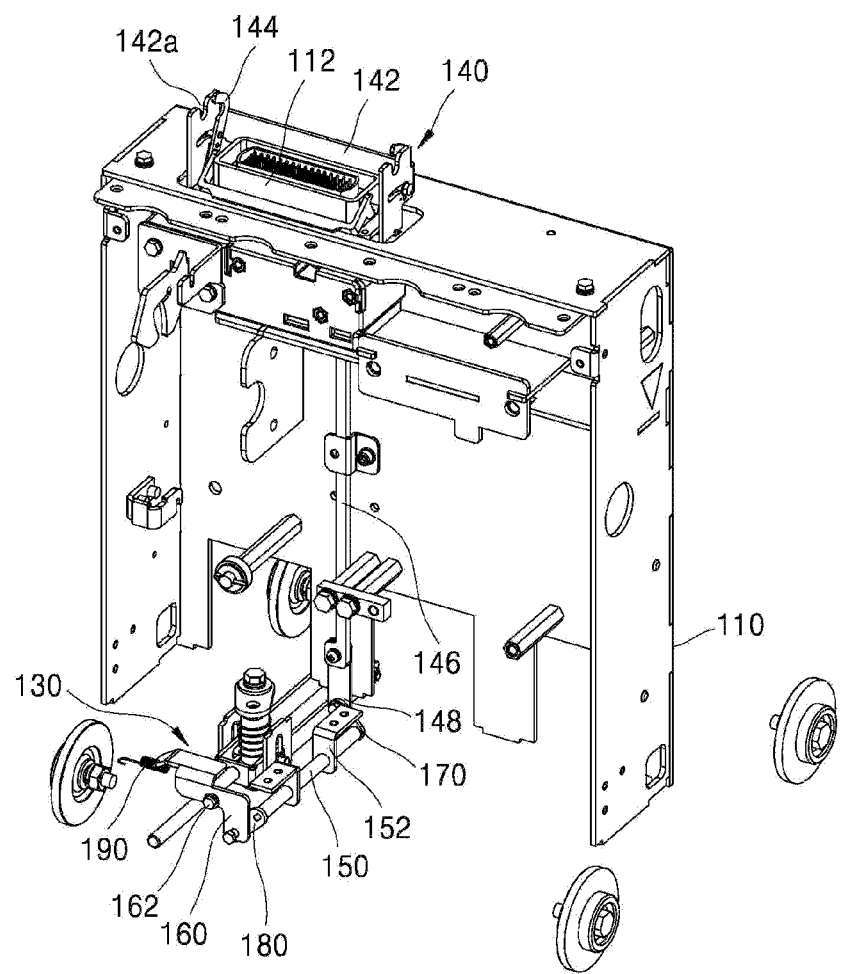
Figure 8:
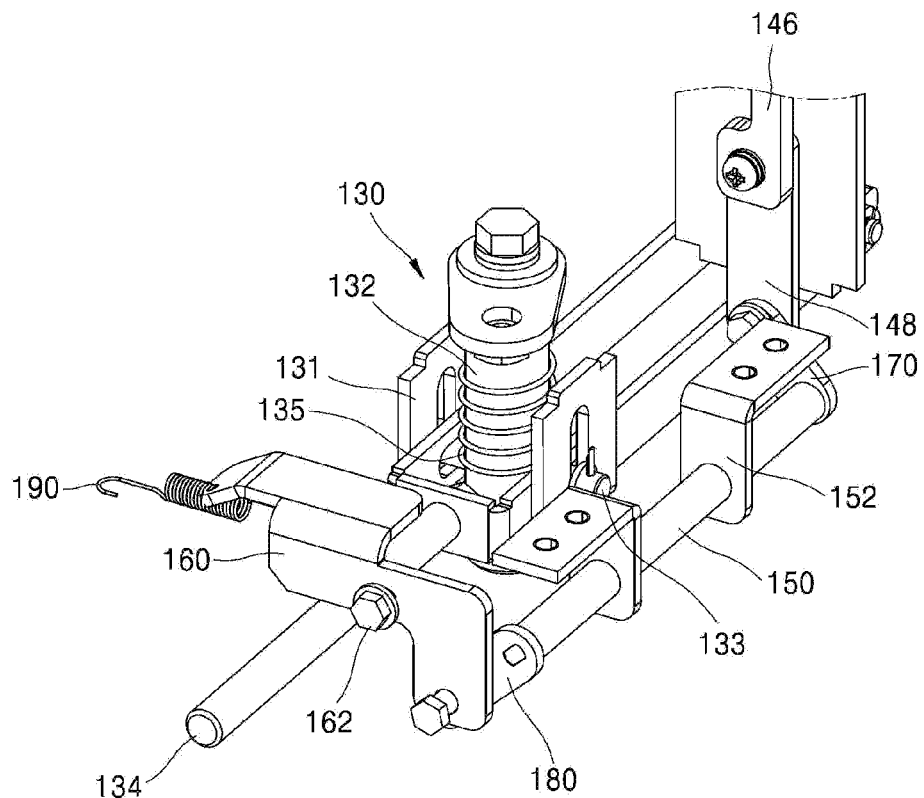
Figure 9:
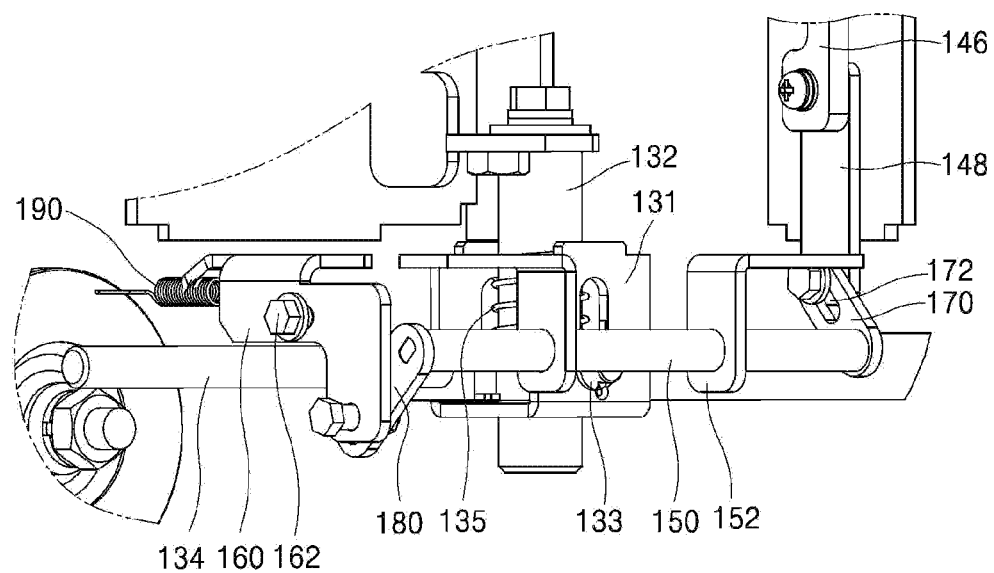
Figure 10:
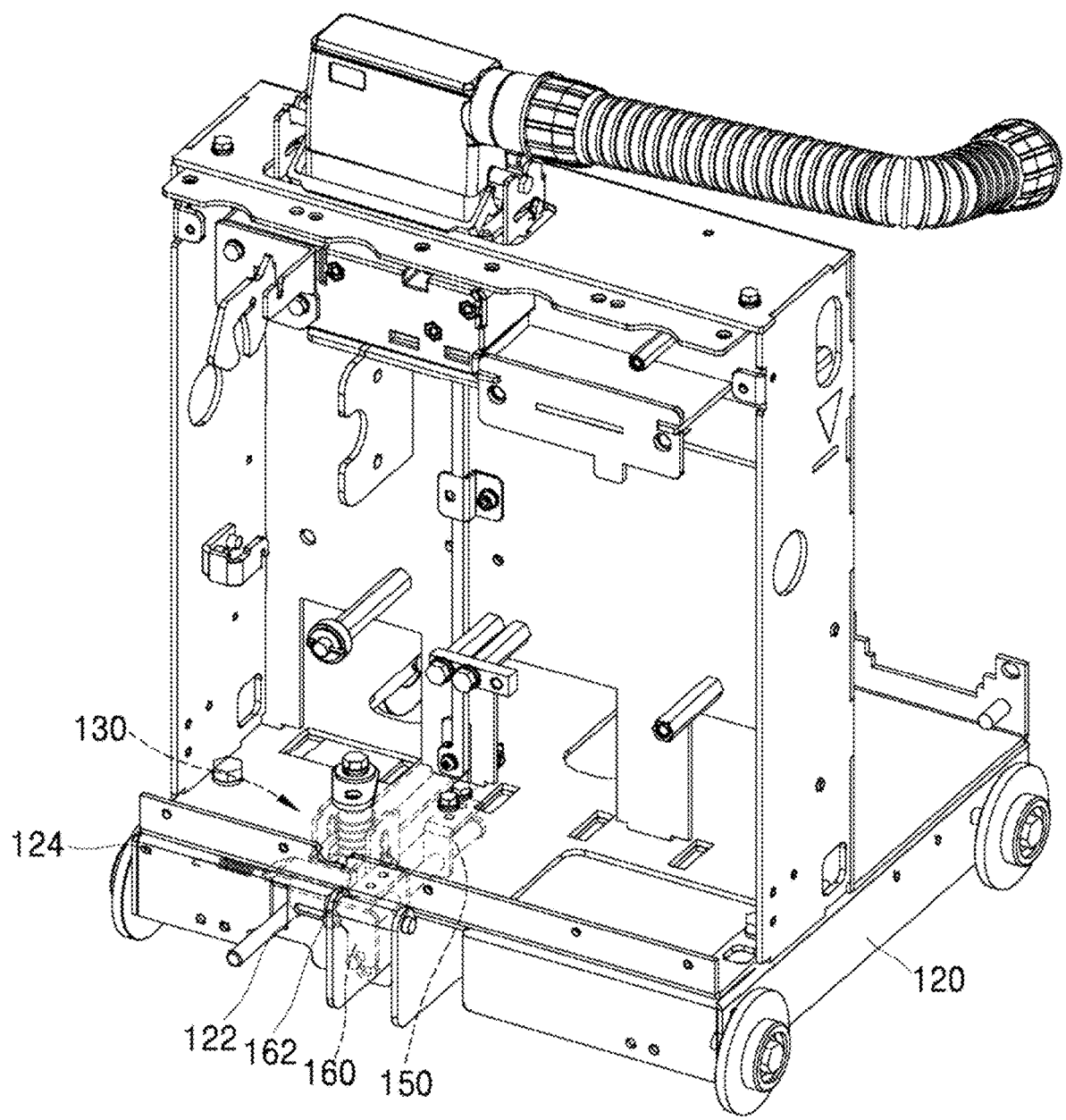
FIG. 10 to FIG. 13 are internal perspective views and partial perspective views showing a state in which the control line plug is inserted into the connector breaker.
Figure 11:
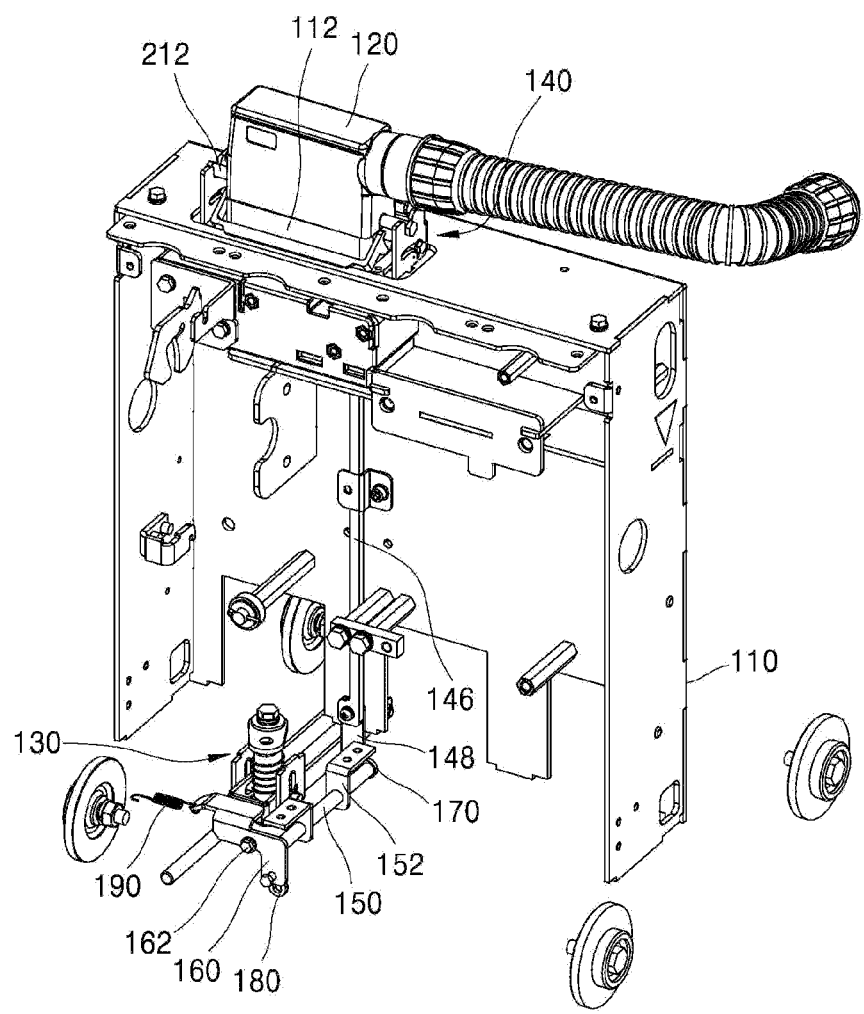
Figure 12:
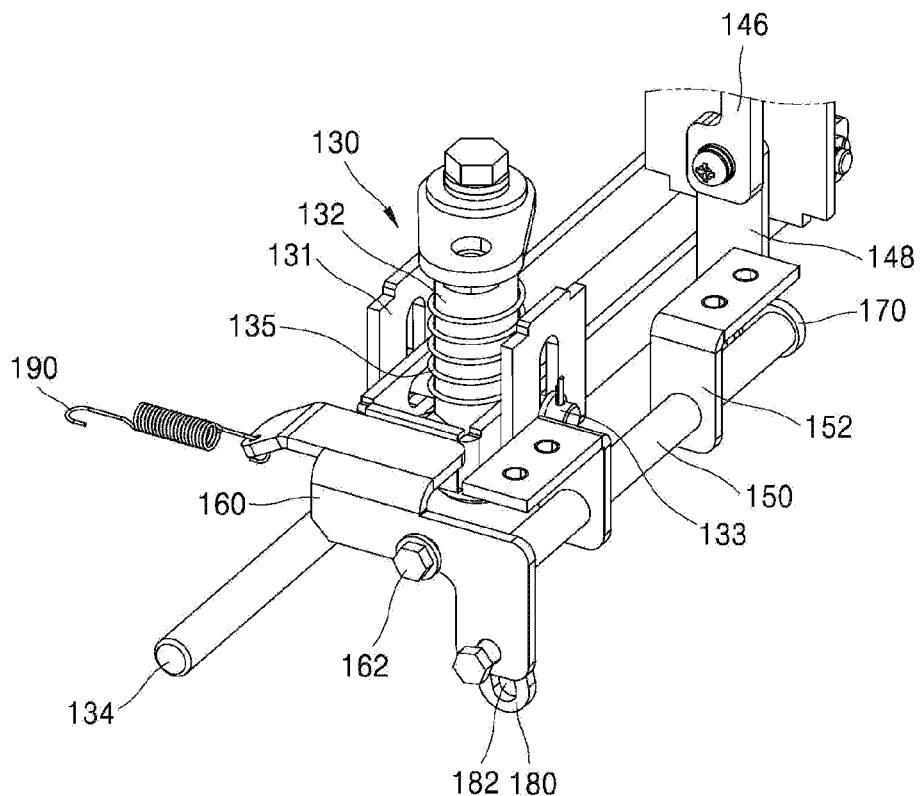
Figure 13:
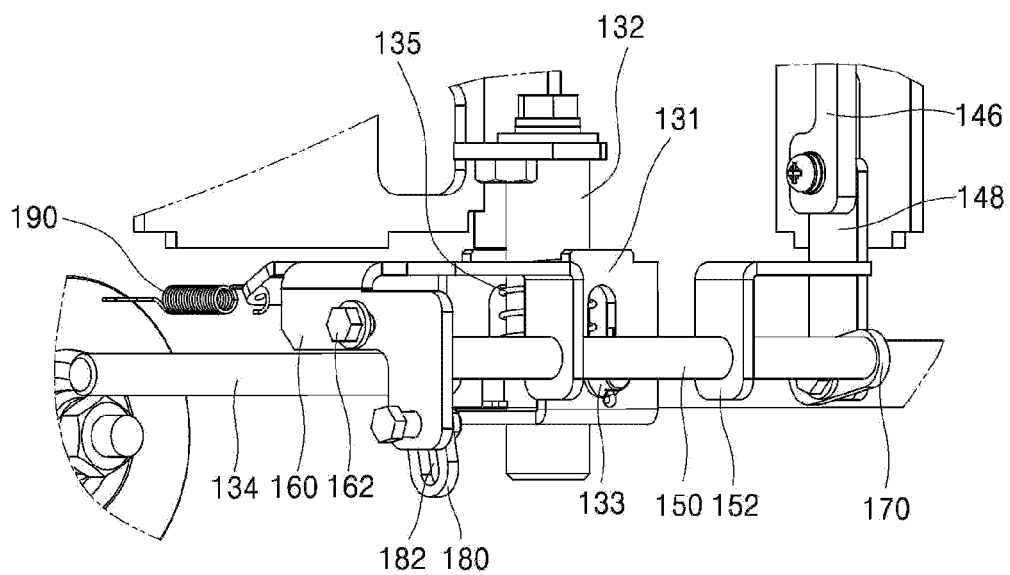

The circuit breaker body 110 may retract into and extend from the cradle 3 of FIG. 3. In the cradle 3 of FIG. 3, a position bracket 4 may be installed to fix the circuit breaker body 110 to the test or service position. In the position bracket 4, a test position hole 4a indicating a test position and a service position hole 4b indicating a service position may be formed.

The transfer vehicle 120 may include a lever-type extending/retracting motion interlock assembly 130.

[Lever-Type Extending/Retracting Motion Interlock Assembly]

The lever-type extending/retracting motion interlock assembly 130 may be installed on the transfer vehicle 120. The lever-type extending/retracting motion interlock assembly 130 may include a mount plate 131 installed on a bottom of the transfer vehicle 120, an interlock shaft 132 extending through the mount plate 131, an interlock pin 133 extending through the interlock shaft 132 and the mount plate 131, an interlock lever 134 pivotally installed on the transfer vehicle 120 to elevate the interlock shaft 132, and a return spring 135 provided between the interlock pin 133 and the mount plate 131 to provide elasticity.

The mount plate 131 may have a vertically extending through-hole formed therein. The interlock pin 133 may move up and down along the through-hole.

The lever-type extending/retracting motion interlock assembly 130 may operate as follows. When the interlock lever 134 is lifted-up manually or automatically, the interlock shaft 132 moves up together the interlock pin 133 coupled thereto. At this time, the return spring 135 stores an elastic force therein. When a force applied to the interlock lever 134 is removed, the interlock pin 133 descends under a restoring force of the return spring 135 and thus the interlock shaft 132 returns to its original position.

As described above, the test position hole 4a and the service position hole 4b may be formed in the position bracket 4 of the cradle 3 of FIG. 3. In order to retract/extend the circuit breaker body 110, the interlock lever 134 may be lifted up so that the interlock lever 134 inserted in the test position hole 4a or the service position hole 4b is removed out thereof.

In this way, the lever-type extending/retracting motion interlock assembly 130 may constrain the retracting and extending motion of the circuit breaker body 110.

In one example, a blocking plate 160 may be placed on a top of the interlock lever 134 between an end of the interlock lever 134 to which an external force is applied to lift the interlock lever 134 and the interlock shaft 132.

When the blocking plate 160 is placed close to a top portion of the interlock lever 134, the interlock lever 134 cannot be lifted, so that the circuit breaker body 110 cannot retract into and extend from the cradle (FIG. 6 to FIG. 9). When the blocking plate 160 is not placed on the top portion of the interlock lever 134 or is spaced apart upwardly therefrom by a sufficient space, the interlock lever 134 may be lifted up, so that the circuit breaker body 110 may retract into and extend from the cradle (FIG. 10 to FIG. 13).

The blocking plate 160 will be described later.

[Plug Connector Assembly]

The plug connector assembly 140 may include a plug bracket 142, a latch 144 that is pivotally installed on each of both opposing sides of the plug bracket 142, and a connecting link 146 that is connected to a bottom of the plug bracket 142. A bottom of the connecting link 146 may be connected to the blocking plate 160 to be described later.

Further, the plug connector assembly 140 may further include a connecting plate 148. In this regard, the blocking plate 160 may be connected to a bottom of the connecting plate 148.

The plug connector assembly 140 may be raised or lowered as the control line plug 210 is inserted into or removed from the connector 112 provided on a top portion of the circuit breaker body 110. Further, when the control line plug 210 is inserted into the connector 112, the control line plug 210 may be prevented from being separated therefrom.

In this regard, the control line plug 210 may refer to a plug connected to the circuit breaker body 110 to supply electricity to the circuit breaker body 110 or to remotely control the circuit breaker body 110.

Specifically, when the control line plug 210 is inserted into the connector 112, a protrusion 212 of the control line plug 210 is inserted into a receiving groove 142a formed in a side plate of the plug bracket 142 to press the plug connector assembly 140. Accordingly, the plug connector assembly 140 descends, such that the connecting link 146 and the connecting plate 148 may also descend. Thus, the latch 144 rotates so that the protrusion 212 of the control line plug 210 cannot escape from the receiving groove 142a and may be constrained therein.

On the contrary, when the control line plug 210 is removed from the connector 112, the plug connector assembly 140 may move up, and accordingly, the connecting link 146 and the connecting plate 148 may move up.

[Shaft]

The shaft 150 may have a cylindrical shape. Further, one side of the shaft 150 may be connected to the bottom of the plug connector assembly 140 and the other side thereof may be connected to the blocking plate 160.

In this regard, one side of the shaft 150 may be coupled with a first link 170 and may be connected to the bottom of the plug connector assembly 140 via the first link 170. Further, the other side of shaft 150 may be coupled to a second link 180 and may be connected to the blocking plate 160 via the second link 180. The description of the first link 170 and the second link 180 will be made later.

The shaft 150 may rotate in different directions based on movement up and down of the plug connector assembly 140. Further, the shaft 150 may transmit a rotational force to the blocking plate 160.

Specifically, for example, when the plug connector assembly 140 descends, the shaft 150 may rotate in a counterclockwise direction. Thus, on receiving the rotational force in the counterclockwise direction, the blocking plate 160 may move horizontally to one side (e.g., a right side in the drawing) (FIG. 10 to FIG. 13).

On the contrary, when the plug connector assembly 140 moves up, the shaft 150 may rotate in the clockwise direction. Thus, on receiving the rotational force in the clockwise direction, the blocking plate 160 may move horizontally to the other side (e.g., a left side in the drawing) (FIG. 6 to FIG. 9).

In this way, the shaft 150 may convert the ascending and descending motion of the plug connector assembly 140 into a rotational motion and transfer the rotation motion to the blocking plate 160, thereby stably converting the ascending and descending movement to the horizontal movement of the blocking plate 160 easily and at a low cost. Therefore, durability of the plug interlock device may be easily improved using a simple configuration and at a low cost, and the plug interlock device may operate stably.

Further, a kinetic force is transmitted via the rotation of the shaft 150. Thus, even when the plug connector assembly 140 and the blocking plate 160 are far apart from each other, the kinetic force may be transmitted stably therebetween. Therefore, the blocking plate 160 may be freely installed in an appropriate position regardless of a distance thereof from the plug connector assembly 140.

Further, the shaft 150 may be supported by a support 152 and may rotate in place. The support 152 may be coupled to an inner side of the transfer vehicle 120 to support the shaft 150.

In this way, the shaft 150 may be supported by the support 152 and may rotate in place. Thus, the shaft may stably convert the ascending and descending movement of the plug connector assembly 140 into the horizontal movement of the blocking plate 160. Therefore, durability of the plug interlock device may be easily improved using a simple configuration and at a low cost, and the plug interlock device may operate stably.

Further, even when the plug connector assembly 140 and the blocking plate 160 are far apart from each other, the kinetic force may be transmitted stably therebetween. Therefore, the blocking plate 160 may be freely installed in an appropriate position regardless of a distance thereof from the plug connector assembly 140.

[Blocking Plate]

The blocking plate 160 may be connected to the other side of the shaft 150. Further, the blocking plate 160 may be installed on a top portion of the interlock lever 134.

The blocking plate 160 may constrain or release an operation of the lever-type extending/retracting motion interlock assembly 130 while moving horizontally under the rotation of the shaft 150.

Specifically, when the control line plug 210 is inserted into the connector 112 such that the shaft 150 rotates counterclockwise, the blocking plate 160 may move horizontally to one side (e.g., to the right side in the drawing) as shown in FIG. 10 to FIG. 13 such that an upper space is opened into which the interlock lever 134 moves up. That is, the blocking plate 160 may release the movement of the lever-type extending/retracting motion interlock assembly 130. Therefore, the interlock lever 134 may be lifted up such that the interlock shaft 132 inserted in the test/service position holes 4a and 4b of FIG. 3 may be pulled out thereof, so that the circuit breaker body 110 may retract into and extend from the cradle.

On the contrary, when the control line plug 210 is removed from the connector 112 such that the shaft 150 rotates in a clockwise direction, the blocking plate 160 moves horizontally to the other side (e.g., to the left side in the drawing), as shown in FIGS. 6 to 9, such that the upper space into which the interlock lever 134 moves up may be blocked. That is, the blocking plate 160 may constrain the movement of the lever-type extending/retracting motion interlock assembly 130. Therefore, the interlock lever 134 cannot be lifted up, such that the interlock shaft 132 inserted in the test/service position holes 4a and 4b in FIG. 3 cannot be pulled out thereof, so that the circuit breaker body 110 cannot retract into and extend from the cradle.

In one example, while the circuit breaker body 110 retracts and extends between the test position hole 4a and the service position hole 4b in FIG. 3, there is no hole in the position bracket 4, so that the interlock lever 134 is maintained in a lifted state thereof. Thus, the interlock lever 134 may continuously keep blocking a space of the other side (e.g., the left side in the drawing) into which the blocking plate 160 may move horizontally.

Therefore, while the circuit breaker body 110 is retracting and extending between the test/service position holes 4a/4b, the blocking plate 160 cannot move horizontally to the other side (e.g., to the left side in the drawing), so that the control line plug 210 cannot be removed from the connector 112.

Specifically, while the circuit breaker body 110 is retracting and extending between the test/service position holes (4a/4b in FIG. 3), the interlock lever 134 as lifted upwardly may continuously keep blocking a space of the other side (e.g., the left side in the drawing) into which the blocking plate 160 may move horizontally. Thus, the blocking plate 160 cannot move horizontally to the other side (e.g., to the left side in the drawing). When the blocking plate 160 cannot move horizontally to the other side (e.g., to the left side in the drawing), the shaft 150 cannot rotate in a clockwise direction. When the shaft 150 cannot rotate in a clockwise direction, the plug connector assembly 140 cannot move up. When the plug connector assembly 140 cannot move up, the latch 144 cannot rotate. When the latch 144 cannot rotate, the protrusion 212 of the control line plug 210 cannot be pulled out of the receiving groove 142a and thus the control line plug 210 cannot be removed from the connector 112.

In this way, as the control line plug 210 is inserted into or removed from the connector 112, the plug connector assembly 140 moves up and down. Thus, the shaft 150 rotates as the plug connector assembly 140 moves up and down. Thus, as the shaft 150 rotates, the blocking plate 160 moves horizontally, thereby disallowing or allowing the movement of the lever-type extending/retracting motion interlock assembly 130. Thus, the circuit breaker body 110 may retract into and extend from the cradle only when the control line plug 210 is inserted into the connector. The control line plug 210 may not be removed therefrom while the circuit breaker retracts and extends.

Further, the blocking plate 160 may have a protrusion 162 on one side thereof. The protrusion 162 may move along a horizontal guide groove (122 in FIG. 6 and FIG. 10) formed in the transfer vehicle 120.

The protrusion 162 may be formed on one side of the blocking plate 160. As the protrusion 162 moves along the guide groove 122 extending in the horizontal direction and formed in the transfer vehicle 120, the blocking plate 160 may move stably horizontally. Therefore, durability of the plug interlock device may be easily improved using a simple configuration and at low cost, and the plug interlock device may operate stably.

Further, the protrusion 162 moving along the guide groove 122 extending the horizontal direction and formed in the transfer vehicle 120 may be easily observed from an outside. Thus, an operator of the device may easily check whether the plug interlock device operates normally.

Further, the blocking plate 160 may be disposed between an end (a front side in the drawing) of the interlock lever 134 to which the lifting external force is applied and the interlock shaft 132, as shown in FIGS. 6 to 13, thereby constraining or allowing the movement of the interlock lever 134.

In this way, the blocking plate 160 may be disposed between an end (a front side in the drawing) of the interlock lever 134 to which the lifting external force is applied and the interlock shaft 132, thereby constraining or allowing the movement of the interlock lever 134. Thus, the blocking plate 160 may restrict the movement of the interlock lever 134 while being present nearby a point of action of the external force, thereby preventing excessive external force from being transmitted to a component such as the interlock shaft 132 that is far from the point of action of the external force. Therefore, durability of the plug interlock device may be easily improved using a simple configuration and at low cost, and the plug interlock device may operate stably.

Further, the blocking plate 160 near the point of action of the external force may be easily observed. Thus, the operator of the device may easily check whether the plug interlock device operates normally.

[Link]

The first link 170 may be connected to the plug connector assembly 140 and the shaft 150. Specifically, one side of the first link 170 may be rotatably and movably connected to a lower end of the plug connector assembly 140 and the other side thereof may be coupled to one side of the shaft 150.

One side of the first link 170 may be rotatably and movably connected to a lower end of the plug connector assembly 140 and the other side thereof may be coupled to one side of the shaft 150, thereby stably converting the ascending and descending motion of the plug connector assembly 140 into the rotational motion of the shaft 150 easily, at a low cost and using a simple configuration.

Specifically, for example, a first sliding hole (172, FIG. 9) may be formed in one side of the first link 170. The first link 170 may be rotatably and movably connected to the lower end of the plug connector assembly 140 through the first sliding hole 172.

For example, a screw may be coupled to the first sliding hole 172 so that the first link 170 may be rotatably and movably connected to the lower end of the plug connector assembly 140.

In this way, the first sliding hole (172 in FIG. 9) may be formed in one side of the first link 170, and the first link 170 may be rotatably and movably connected to the lower end of the plug connector assembly 140 through the first sliding hole 172, thereby stably converting the ascending and descending motion of the plug connector assembly 140 into the rotational motion of the shaft 150 easily, at a low cost and using a simple configuration.

The second link 180 may be connected to the blocking plate 160 and the shaft 150. Specifically, one side of the second link 180 may be rotatably and movably connected to the blocking plate 160 of the second link 180, and the other side thereof may be coupled to the other side of the shaft 150.

One side of the second link 180 may be rotatably and movably connected to the blocking plate 160, and the other side thereof may be coupled to the other side of the shaft 150, thereby stably converting the rotational motion of the shaft 150 to the horizontal motion of the blocking plate 160 easily, at a low cost, and using a simple configuration.

Specifically, for example, a second sliding hole (182 in FIG. 12 and FIG. 13) may be formed in one side of the second link 180. The second link 180 may be rotatably and movably connected to the blocking plate 160 through the second sliding hole 182.

For example, the screw may be coupled to the second sliding hole 182 so that the second link 180 may be rotatably and movably connected to the blocking plate 160.

In this way, the second sliding hole (182, FIG. 12 and FIG. 13) may be formed in one side of the second link 180, and the second link 180 may be rotatably and movably connected to the blocking plate 160 through the second sliding hole 182, thereby stably converting the rotational motion of the shaft 150 to the horizontal motion of the blocking plate 160 easily, at a low cost and using a simple configuration.

[Spring]

The spring 190 may have one end coupled to the blocking plate 160 and the other end coupled to the transfer vehicle 120. Specifically, for example, the other end of the spring 190 may be configured to be caught in a hole (124 in FIG. 6 and FIG. 8) formed in the transfer vehicle 120.

The spring 190 may be elastically deformed according to the horizontal movement of the blocking plate 160. Specifically, when the control line plug 210 is inserted into the connector 112 such that the plug connector assembly 140 descends and thus the shaft 150 rotates counterclockwise. Thus, as shown in FIG. 10 to FIG. 13, the blocking plate 160 moves horizontally to one side (e.g., the right side in the drawing), such that the spring 190 caught in the hole 124 may increase in a length and thus may be elastically deformed.

The spring 190 may facilitate the horizontal movement of the blocking plate 160 to the other side (e.g., to the left side in the drawing) under the restoring force thereof. Specifically, in order to separate the control line plug 210 from the connector 112, the plug connector assembly 140 should move up, the shaft 150 should rotate clockwise, and the blocking plate 160 should horizontally moves to the other side (e.g., the left side in the drawing). In this regard, the spring 190 may allow the blocking plate 160 to easily move horizontally to the other side (e.g., to the left in the drawing).

In this way, the spring 190 having one end coupled to the blocking plate 160 and the other end coupled to the transfer vehicle 120 may be elastically deformed according to the horizontal movement of the blocking plate 160, such that the control line plug 210 may be easily removed from the connector 112 using a simple configuration. Therefore, the durability of the plug interlock device may be easily improved at a low cost and the plug interlock device may operate stably.

As described above, the present disclosure has been described with reference to the illustrated drawings. However, the present disclosure is not limited by the embodiments disclosed in the present disclosure and drawings. It is apparent that various modifications may be made by a person skilled in the art within the scope of the technical idea of the present disclosure.

In addition, although effects according to the configuration of the present disclosure are not explicitly described while the embodiments of the present disclosure are described, it is natural that the effects predictable from the configuration should be further acknowledged.

What is claimed is:

1. A plug interlock device for a circuit breaker, the plug interlock device comprising:
   a lever-type extending/retracting motion interlock assembly installed on a transfer vehicle so as to allow or disallow a retracting and extending motion of a circuit breaker body;
   a plug connector assembly configured to ascend and descend as a control line plug is inserted into or removed from a connector disposed on a top of the circuit breaker body;
   a shaft having first side connected to a lower end of the plug connector assembly, wherein the shaft rotates in different directions based on ascending and descending of the plug connector assembly;
   a blocking plate connected to a second side of the shaft, wherein the blocking plate moves horizontally based on rotation of the shaft so as to allow or disallow a movement of the lever-type extending/retracting motion interlock assembly; and
   a first link having a first side rotatably and movably connected to the blocking plate and a second side coupled to the second side of the shaft.

2. The plug interlock device of claim 1, wherein the shaft is supported on a support and thus rotates in place.

3. The plug interlock device of claim 1, wherein the plug interlock device further comprises a second link having a first side rotatably and movably connected to a lower end of the plug connector assembly and a second side coupled to the first side of the shaft.

4. The plug interlock device of claim 1, wherein a first sliding hole is formed in the first side of the first link, wherein the first link is rotatably and movably connected to the blocking plate through the first sliding hole.

5. The plug interlock device of claim 1, wherein the blocking plate has a protrusion formed on a first side thereof, wherein the protrusion moves along a guide groove extending in a horizontal direction and formed in the transfer vehicle.

6. The plug interlock device of claim 1, wherein the lever-type extending/retracting motion interlock assembly includes:
   an interlock lever moving under an external force; and
   an interlock shaft connected to the interlock lever so as to allow or disallow the retracting and extending motion of the circuit breaker body,
   wherein the blocking plate is disposed between the interlock shaft and an end of the interlock lever receiving an external force and is configured to allow or disallow a movement of the interlock lever.

7. The plug interlock device of claim 6, wherein the lever-type extending/retracting motion interlock assembly further includes:
   a mount plate installed on a bottom face of the transfer vehicle, wherein the interlock shaft extends through the mount plate;
   an interlock pin extending through the interlock shaft and the mount plate; and
   a return spring disposed between the interlock pin and the mount plate so as to provide an elastic force,
   wherein the interlock pin moves up and down along a through-hole formed in the mount plate.

8. The plug interlock device of claim 1, wherein the plug interlock device further comprises a spring having a first end coupled to the blocking plate and a second end coupled to the transfer vehicle,
   wherein the spring is elastically deformed based on a horizontal movement of the blocking plate.

9. A plug interlock device for a circuit breaker, the plug interlock device comprising:
   a lever-type extending/retracting motion interlock assembly installed on a transfer vehicle so as to allow or disallow a retracting and extending motion of a circuit breaker body;
   a plug connector assembly configured to ascend and descend as a control line plug is inserted into or removed from a connector disposed on a top of the circuit breaker body;
   a shaft having first side connected to a lower end of the plug connector assembly, wherein the shaft rotates in different directions based on ascending and descending of the plug connector assembly;
   a blocking plate connected to a second side of the shaft, wherein the blocking plate moves horizontally based on rotation of the shaft so as to allow or disallow a movement of the lever-type extending/retracting motion interlock assembly; and
   a first link having a first side rotatably and movably connected to a lower end of the plug connector assembly and a second side coupled to the first side of the shaft,
   wherein a first sliding hole is formed in the first side of the first link, and
   wherein the first link is rotatably and movably connected to the lower end of the plug connector assembly through the first sliding hole.

* * * * *